US008441337B2

(12) United States Patent
Fein et al.

(10) Patent No.: US 8,441,337 B2
(45) Date of Patent: May 14, 2013

(54) MULTICOMPUTER DATA TRANSFERRING AND FILE ACCESSING TO AUTHENTICATE ONLINE VOTING AND REGISTRATION IN A SECURE DATABASE SYSTEM

(75) Inventors: Gene S. Fein, Lenox, MA (US); Edward Merritt, Lenox, MA (US)

(73) Assignee: Gefemer Research Acquisitions, LLC, Wilmington, DE (US)

( * ) Notice: Subject to any disclaimer, the term of this patent is extended or adjusted under 35 U.S.C. 154(b) by 217 days.

(21) Appl. No.: 12/832,891

(22) Filed: Jul. 8, 2010

(65) Prior Publication Data

US 2010/0312616 A1    Dec. 9, 2010

Related U.S. Application Data

(63) Continuation of application No. 11/865,461, filed on Oct. 1, 2007, now abandoned, and a continuation of application No. 11/859,527, filed on Sep. 21, 2007, now abandoned.

(51) Int. Cl.
*G05B 19/00*     (2006.01)

(52) U.S. Cl.
USPC .................................................... 340/5.82

(58) Field of Classification Search ............ 340/5.82; 455/411; 379/92.02, 92.04, 93.03
See application file for complete search history.

(56) References Cited

U.S. PATENT DOCUMENTS

| | | | | |
|---|---|---|---|---|
| 3,644,675 A | * | 2/1972 | Watlington | 379/92.02 |
| 6,223,290 B1 | * | 4/2001 | Larsen et al. | 726/3 |
| 6,976,171 B1 | * | 12/2005 | Ritter et al. | 713/193 |
| 2002/0141551 A1 | | 10/2002 | Tittle | |
| 2003/0142800 A1 | | 7/2003 | Paschal et al. | |
| 2003/0182182 A1 | | 9/2003 | Kocher | |
| 2004/0248552 A1 | * | 12/2004 | Mazurick et al. | 455/411 |
| 2009/0079538 A1 | | 3/2009 | Fein et al. | |
| 2009/0089155 A1 | | 4/2009 | Fein et al. | |

OTHER PUBLICATIONS

International Preliminary Report on Patentability for corresponding International App. No. PCT/US2008/077223, dated Mar. 24, 2010 (7 pages).
U.S. Appl. No. 11/859,527, filed Sep. 21, 2007.
Preliminary Amendment filed on Jul. 8, 2010 in U.S. Appl. No. 11/859,527.
U.S. Appl. No. 11/865,461, filed Oct. 1, 2007.
Office Action issued in U.S. Appl. No. 11/865,461 dated May 12, 2010.

* cited by examiner

*Primary Examiner* — Vernal Brown (57) ABSTRACT

A method and system is provided for file accessing and data transferring to secure online voting using a multilayered security system where all contents of the data may be delivered to users of varied electronic devices. The data transferring occur as an external communication between separate computers which themselves are distinguishable processing entities, such as a voter processing center, online voting station, registration station, and calling station. The system includes (i) requesting at least one voter and biometric information based on a security level; (ii) receiving the at least one voter and biometric information from the user; (iii) verifying the at least one voter and biometric information against the stored voter and biometric information; (iv) in response to acceptable verifications, sending a voting ballot; and (v) receiving and storing the voting ballot with a vote selection. The security level may depend on the type of ballot.

25 Claims, 9 Drawing Sheets

FIG. 1

| LOWEST SECURITY LEVEL | BIOMETRIC INFORMATION 127 --> | FACE | FINGERPRINT | HAND GEOMETRY | RETINA | IRIS | SIGNATURE | VEIN | VOICE |
|---|---|---|---|---|---|---|---|---|---|
| | VOTER INFORMATION 125 ↓ | | | | X | | | | |
| | NAME | X | | | | | | | |
| | PRESENT ADDRESS | X | | | | | | | |
| | PREVIOUS ADDRESS | | | | | | | | |
| | BUSINESS ADDRESS | | | | | | | | |
| | BIRTH DATE | X | | | | | | | |
| | PLACE OF BIRTH | | | | | | | | |
| | DRIVER'S LICENSE NUMBER | X | | | | | | | |
| | HOME TELEPHONE NUMBER | | | | | | | | |
| | BUSINESS TELEPHONE NUMBER | | | | | | | | |
| | E-MAIL ADDRESS | | | | | | | | |

FIG. 2A

| HIGHEST SECURITY LEVEL | BIOMETRIC INFORMATION 127 --> | FACE | FINGERPRINT | HAND GEOMETRY | RETINA | IRIS | SIGNATURE | VEIN | VOICE |
|---|---|---|---|---|---|---|---|---|---|
| | VOTER INFORMATION 125 ↓ | | X | | X | | | | |
| | NAME | X | | | | | | | |
| | PRESENT ADDRESS | X | | | | | | | |
| | PREVIOUS ADDRESS | | | | | | | | |
| | BUSINESS ADDRESS | | | | | | | | |
| | BIRTH DATE | | | | | | | | |
| | PLACE OF BIRTH | | | | | | | | |
| | DRIVER'S LICENSE NUMBER | | | | | | | | |
| | HOME TELEPHONE NUMBER | | | | | | | | |
| | BUSINESS TELEPHONE NUMBER | | | | | | | | |
| | E-MAIL ADDRESS | | | | | | | | |

*FIG. 2B*

| HIGHEST SECURITY LEVEL | BIOMETRIC INFORMATION 127 --> | FACE | FINGERPRINT | HAND GEOMETRY | RETINA | IRIS | SIGNATURE | VEIN | VOICE |
|---|---|---|---|---|---|---|---|---|---|
| | VOTER INFORMATION 125 ↓ | | | | | | | | |
| | NAME | X | | | | | X | | |
| | PRESENT ADDRESS | X | | | | | | | |
| | PREVIOUS ADDRESS | X | | | | | | | |
| | BUSINESS ADDRESS | X | | | | | | | |
| | BIRTH DATE | X | | | | | | | |
| | PLACE OF BIRTH | X | | | | | | | |
| | DRIVER'S LICENSE NUMBER | X | | | | | | | |
| | HOME TELEPHONE NUMBER | X | | | | | | | |
| | BUSINESS TELEPHONE NUMBER | X | | | | | | | |
| | E-MAIL ADDRESS | X | | | | | | | |

MULTICOMPUTER DATA TRANSFERRING AND FILE ACCESSING TO AUTHENTICATE ONLINE VOTING AND REGISTRATION IN A SECURE DATABASE SYSTEM

RELATED APPLICATIONS

This application is a continuation of and claims priority under 35 U.S.C. §120 from co-pending U.S. patent application Ser. No. 11/865,461 filed Oct. 1, 2007 and entitled, "MULTICOMPUTER DATA TRANSFERRING AND FILE ACCESSING TO AUTHENTICATE ONLINE VOTING AND REGISTRATION IN A SECURE DATABASE SYSTEM," which is hereby incorporated by reference in its entirety. This application also claims priority to U.S. patent application Ser. No. 11/859,527, tiled Sep. 21, 2007 and entitled, "MULTICOMPUTER DATA TRANSFERRING AND FILE ACCESSING TO AUTHENTICATE ONLINE VOTING AND REGISTRATION IN A SECURE DATABASE SYSTEM," which is hereby incorporated by reference in its entirety.

BACKGROUND INFORMATION

It is well known that passwords for secure accounts may be given either verbally or typed into a keypad and registered electronically to give users access, or to block unauthorized users from gaining access, to accounts or other secure systems. These passwords include everything from the touchpad at an ATM, to the sliding and reading of a credit card number, to the account number and specific user data requested by a bank's customer service phone operator to validate a customer's identity in order to access their mortgage information over the telephone.

Currently, physical signatures on paper or electronic keypads, entering of alphanumeric codes, fingerprint matching, retinal scanning or the answering of personal identification questions are the common methods that are used to validate the authenticity of an individual, to verify identity and conduct secure transactions or be granted secure access to an area, venue, information, ticketed event or account. Also, currently, voting is done in person at a voting station or via absentee ballot collected by voting officials who certify a voter's registration to be legally certified to vote.

Conventional models log signatures via electronic keypad, log touchpad codes, match voice-for-voice activated commands and manual voice data confirmations. Such models for voting are still largely manual in nature using voting rolls and manual methods of registration where a voter presents forms of identification to a voting official who checks the identification to validate and approve a voter's registration to vote and to vote within a certain jurisdiction.

Currently, there is no current security layer that transforms the voting process into a multilayered digital security process where the user's identity could be verified remotely and the user's vote could be made and accounted for online or over wireless networks using technological innovations to verify the user's identity, the user's right to vote where the right exists, maintain the user's privacy and assure that the user's vote is cast and cast in the proper jurisdiction. Many users cannot vote at a poll station due to scheduling, inconvenience, travel or disability. Many users also choose not to vote due to laziness. The result is always that significant members of the eligible voting population either do not vote or even register to vote in elections.

SUMMARY OF THE DISCLOSURE

At least one embodiment relates to a system for file accessing and data transferring to secure online voting utilizing a series of security validation tools including biometric information, such as retinal scanning, video, and fingerprint technology matching to ensure identity. The data transferring occurs as an external communication between separate computers which themselves are distinguishable processing entities, such as a voter processing center, online voting station, registration station, and calling station. The system matches the voter to his or her records enabling the voter to register once in person and then vote securely, authenticating their presence online via the security tools and via specialized IP address tracing to verify the participants, ensuring authenticity of the voting user.

In one embodiment is a method and system for securing online voting using a multilayered security process. The method including at a voter processing center during a connection with a registration station, (i) storing at least one voter information into at least one storage device, (ii) storing at least one biometric information into the at least one storage device, (iii) sending a telephone number of the voter processing center to the registration station, in response to a user completing the at least one voter and biometric information; at the voter processing center during a connection with a calling station, (i) verifying the calling station is a telephone number of the user as provided in the least one voter information, (ii) dialing the telephone number of the user in response to a match of the verification, (iii) sending a security code to the calling station in response to the match; at the voter processing center during a connection with an online voting station, (i) receiving the security code from the online voting station, (ii) verifying the security code, (iii) requesting the at least one voter information based on a security level, (iv) receiving the at least one voter information from the online voting station in accordance with the security level, (v) verifying the at least one voter information against the stored voter information in the at least one storage device, (vi) requesting the at least one biometric information based on the security level, (vii) receiving the at least one biometric information from the online voting station in accordance with the security level, (viii) verifying the at least one biometric information against the stored biometric information in the at least one storage device, (ix) in response to acceptable verifications, sending a voting ballot to the online voting station, (x) receiving the voting ballot with a vote selection, (xi) and storing the vote selection in the at least one storage device. A quantity of entering the at least one voter information and the at least one biometric information may be correlated to a level of security, with a highest level of security requiring a maximum quantity of the voter information and biometric information.

Advantages or beneficial features of one or more embodiments may include some or all of the following: (1) Verifying a user's identity remotely or over wireless networks using technological innovations to allow the user to vote electronically; (2) verifying the user's right to vote where the right exists; (3) maintaining the user's privacy and assuring that the user's vote is cast and cast in the proper jurisdiction; (4) providing more accurate verification of the vote than conventional processes, especially of absentee ballots; (5) presenting opportunities to potential voters who cannot vote at a poll station due to scheduling, inconvenience, travel, disability, or laziness; and (6) increasing enrollment and participation in the voting and electoral process. Other advantages and beneficial features of certain embodiments will be apparent to those having ordinary skill in the art.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating the embodiments.

DETAILED DESCRIPTION OF EMBODIMENTS

A description of various embodiments follows.

One embodiment relates to the creation of a system which creates an online voting mechanism which securely authenticates the specific voter, accurately calculates the voter's votes and tabulates votes in the aggregate and by subset.

The system eliminates the need for registered voters to vote at polling stations. Instead voters may either vote online at any time the online polls may be opened for an election until the polls close for an election, or at their assigned polling station(s).

The system is enabled through an augmented voter registration system where, in addition to all of the information presently required to become a registered voter, the registering voter also supplies additional personal identification data to help secure the validity of the voter's online vote. Three of the pieces of additional information that the registering voter may supply are a retinal scan and fingerprints, including a thumb print, as well as a voice recording. The voter also supplies a home phone number, or other number that can be corroborated back to the user.

At the conclusion of the voting process the voter is instructed to call into a main online registration number to receive a password to vote. The voter is instructed that they must call from the number given on their application to receive their password and they must have their pin alphanumeric code given to them at the time of registration to activate the voter registration password system. The registration system validates the voter's pin and also does a reverse number trace to verify the voter's address to the phone number that the voter used to call in. The call must not be blocked by the voter. The voter's voice is also matched against the recording in the system held from the time of registration. If everything is correct, then the user receives a password to the system. If everything is not correct, then the user may be directed to a help line. The call is recorded to help prevent fraud and to collect evidence in the event of fraud. Warnings are also given at the time of registration as to the penalties for voting fraud.

The online voter must then log in online using their password and voter registration number. The user is further validated by a retinal scan using the computer's camera and each vote that is registered via touch screen is fingerprint sensitive to ensure that the same voter is validated for each vote.

Once the online vote is completed and sent back to the central secure server system, the voter's votes may be segmented into a different directory than the voter's name to insure anonymity as to the vote. Such information may be parsed and made private and anonymous via segmenting of the data to secure servers according to ongoing voting regulations—only the data currently logged as public or semi-public would be public and the rest would be segmented and anonymous, with the possible exception of systems auditors and polling officials and other legally authorized officials.

A tally of the votes would be made as servers accrue the votes and segment them among separate elections, referendums and the like. Each polling facility may be tracked separately, as may each demographic area, district, state, Parrish, town, city or nation, or multinational vote that each voter falls into. Potentially, votes could also be taken at the work place, third party digital voting centers, and municipal voting centers or via mobile devices using the same authentication methods.

Figure 1:
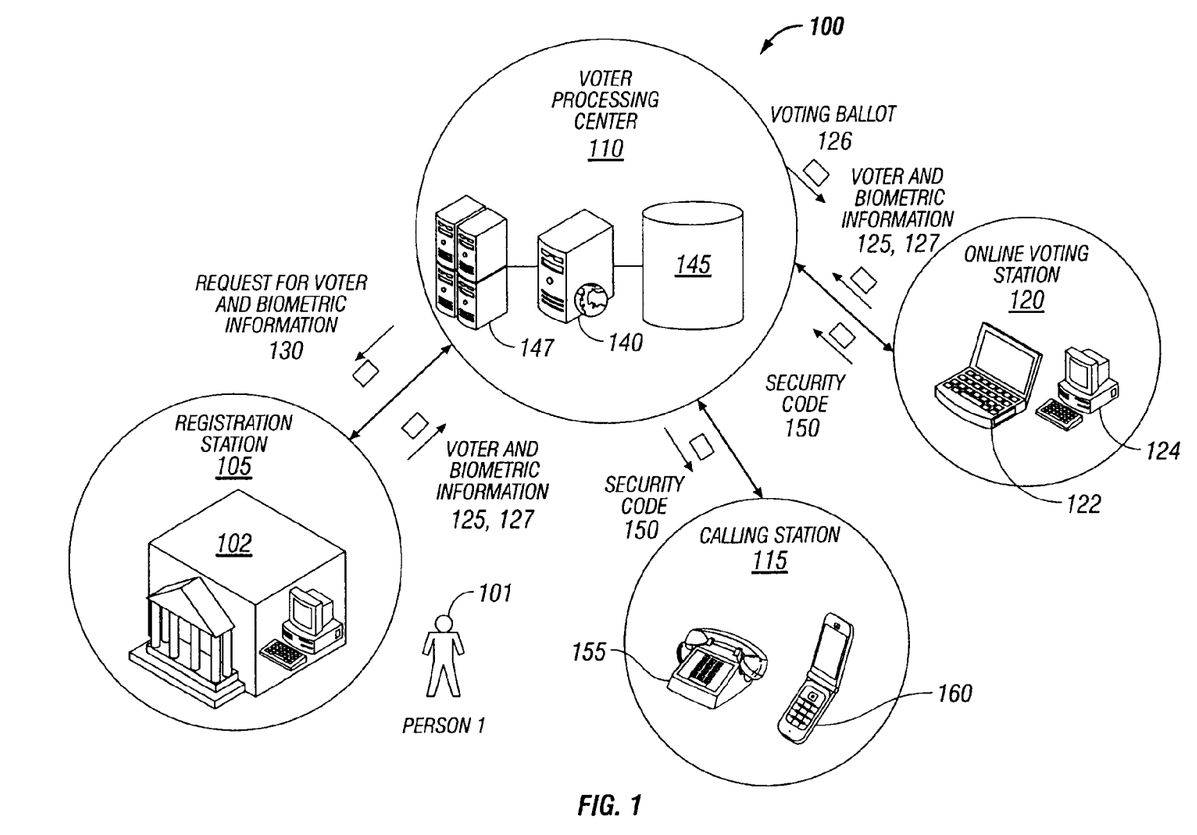
FIG. 1 is a schematic diagram representing a computer system for providing secure online voting using a multilayered security system in accordance with an example embodiment.

FIG. 1 is a schematic diagram representation of a computer system 100 for providing a secure online voting using a multilayered security system. The system 100 includes a registration station 105, voter processing center 110, calling station 115, and online voting station 120. The communications between and among the stations and/or center 105, 110, 115, may be via or include an Ethernet, a local area network (LAN), a wide area network (WAN), the Internet, radio communication, telephone or other wire, cable an/or optical fiber, optical communication, or any other network and/or communication means.

When a voter 101 registers to vote, the voter 101 may come into the registration center 105 in person. The registration center 105, for example, may be a city hall 102. After providing personal information to an employee for verification purposes, a registration form is given to the voter 101. The voter 101 may provide information about the voter 125, including the same questions that are presented on a conventional paper registration form (e.g., name, address (present, previous, mailing, and/or business), citizenship and residence, birth date and place, driver's license number, telephone number, e-mail address, political party affiliation, applicable certifications regarding truthfulness, residency, age and prisoner or parole status, and so forth). In addition, the voter 101 may enter biometric information 127 into the registration station 105. The biometric information 127 may include: (a) face: the analysis of facial characteristics; (b) fingerprint: the analysis of an individual's unique fingerprints; (c) hand geometry: the analysis of the shape of the hand and length of the fingers; (d) retina: the analysis of the capillary vessels located at the back of the eye (e) iris: the analysis of the colored ring that surrounds the eye's pupil (f) signature: the analysis of the way a person signs his name (g) vein: the analysis of pattern of veins in the back if the hand and the wrist (h) voice: the analysis of the tone, pitch, cadence and frequency of a person's voice.

The voter and biometric information 125, 127 may be securely transmitted to the voting processing center 110. The transmission of data may be encrypted with 128-bit or greater encryption. The voter processing center 110 may include central computer 140 exchanging information between one or more database servers 147 coupled to one or more storage devices 145. Typically, one of the storage devices 145 is located at a different location than the voter processing center 110, so as to provide data backup and protection against such dangers as fire, earthquake, storm, terror attack, and the like. The voter and biometric information 125, 127 are securely stored in the one or more storage devices 145. After the voter 101 completes the registration, the voter processing center 110 sends a telephone number of the voter processing center 110. The voter 101 would call this number to obtain a security code 150.

The voter 101 using the given telephone number dials into the voter processing center 110 using a calling station 115, for example, a plain old telephone 155 or cellular phone 160. As a part of the multi-level security process, the voter is required to call the voter processing center 110 using the calling station 115 that is associated with the telephone number as provided in the voter information during the registration process. The voter processing center 110 may use that telephone number to compare it with the incoming telephone to verify the authenticity of the voter 101. The processing center 110 may use a caller identification feature to obtain the telephone number of the voter's calling station 115 for verification purposes. If the telephone numbers do not match, the voter processing center 110 may transmit such a message so indicating.

Upon completion of a match of the telephone numbers, the voter processing center 110 may send a message to the calling station 115. The message may be a voice message saying that the verification was successful and the user 101 should hang up the calling station 115. In response to terminating a connection between the calling station 115 and the voter processing center 110, the voter 101 may receive a call-back to the telephone number as provided by the voter 101 during the registration process. When the voter 101 answers the call-back, a security code 150 is given to the voter. The security code 150 may be an alphanumeric code. An alphanumeric code is a series of letters and numbers written in a form understandable and processable by a computer. If the voter 101 does not pick up the calling station 115 for the call-back, the processing center 110 may call back at another time, such as an hour later.

Figure 4:
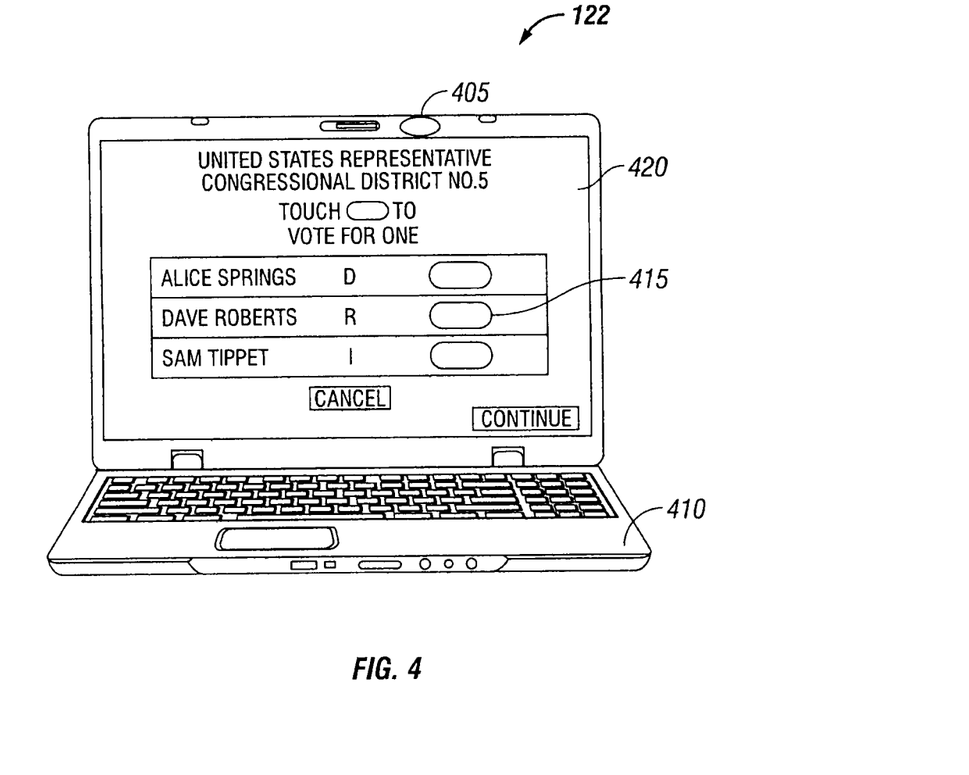
FIG. 4 is an example online voting station in accordance with an example embodiment.

On the day of the election with a fixed timing window to vote, the voter 101 signs into the voter processing center 110 using an online voting station 120. The online voting station 120 provides a secure connection with the voter processing center 110. The online voting station 120 may be a computer 124 or laptop 122. Communication between the online voting station 120 and the processing center 110 may be via any convenient communication link, including but not limited to, wire and cable, telephone system, optical fiber, optical transmission, radio or other RF transmission, network, LAN, WAN, an Intranet, the Internet, and the like. Each online voting station 120 thus has essentially direct and immediate access to the voter processing center 110. Where such access is via the Internet and/or World Wide Web, the only communication facility needed at any location is a conventional telephone line to connect to the modem of computers 124 and/or laptop 122. The online voting station 120, such as the laptop 122, may be transported to any desired location, such as libraries, schools, vehicle registration and/or inspection sites, police stations, municipal facilities, government offices, military bases, shopping centers, or any other location where it is desired to register voters 101 and/or conduct voting. FIG. 4 describes a typical online voting station 120.

The registered voter 101 enters the security code 150 into the online voting station 120 for accessing the voter processing center 110. The voter processing center 110 verifies the security code 150 against the one or more storage devices 145. If there is a match of the security code 150, the voter processing center 110 sends a request to the online voting station 120 for the voter information 125. The amount of voter information 125 being requested may depend on a level of security of the election. Thus, a highest level of security requires a maximum quantity of the voter information 125. For example, in a local town election for Board of Selectmen, the level of security may be minimal. In such cases, the voter processing center 110 may be programmed to request the voter's social security number and address. In contrast, in a presidential election, the voter processing center 110 may be programmed to request more voter information 125, such as name, address, citizenship and residence, birth date and place, driver's license number, telephone number. The voter processing center 110 then verifies the voter information 125.

Upon completion of a successful verification, the voter processing center 110 then sends a request for at least one biometric information 127. Verifying includes retrieving voter information 125 from the one or more storage devices 145 associated with the voter 101, i.e., the voter as identified in the voting transaction request, from it database and comparing the voter information 125 to the information submitted as part of the proposed voting transaction request. Approval of the voting transaction depends upon verification of the voter information 125 inputted by the voter 101. The quantity of biometric information is the same logic as the voter information 125. The higher the level of security required, the more biometric information is requested. For example, in a presidential election the following biometric information 127 is required from the voter 101: face, fingerprint, hand geometry, retina, iris, signature, vein, and voice.

Figure 2A:
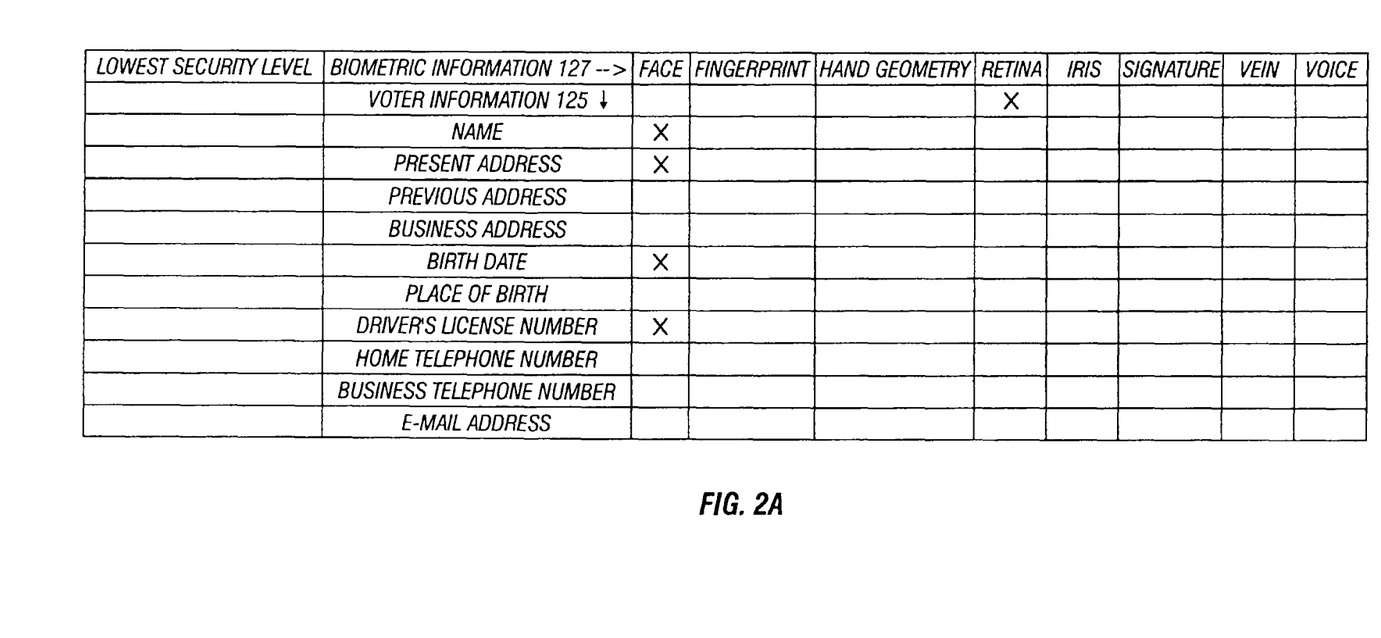
FIGS. 2A-2C are grids of biometric and voter information in accordance with an example embodiment.
Figure 2B:
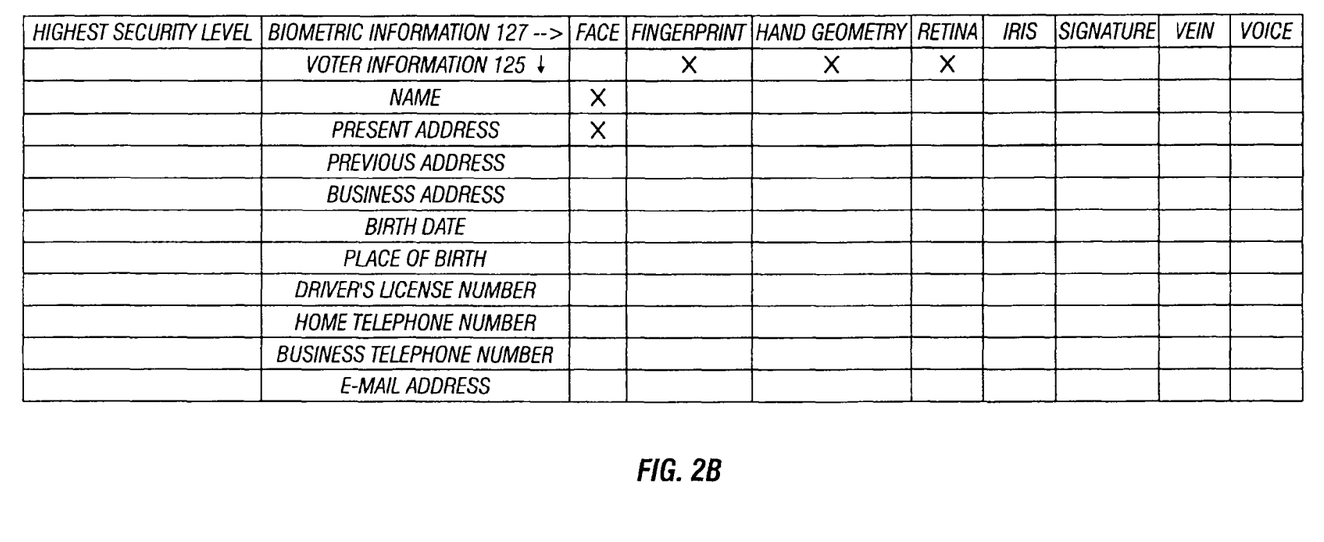
Figure 2C:
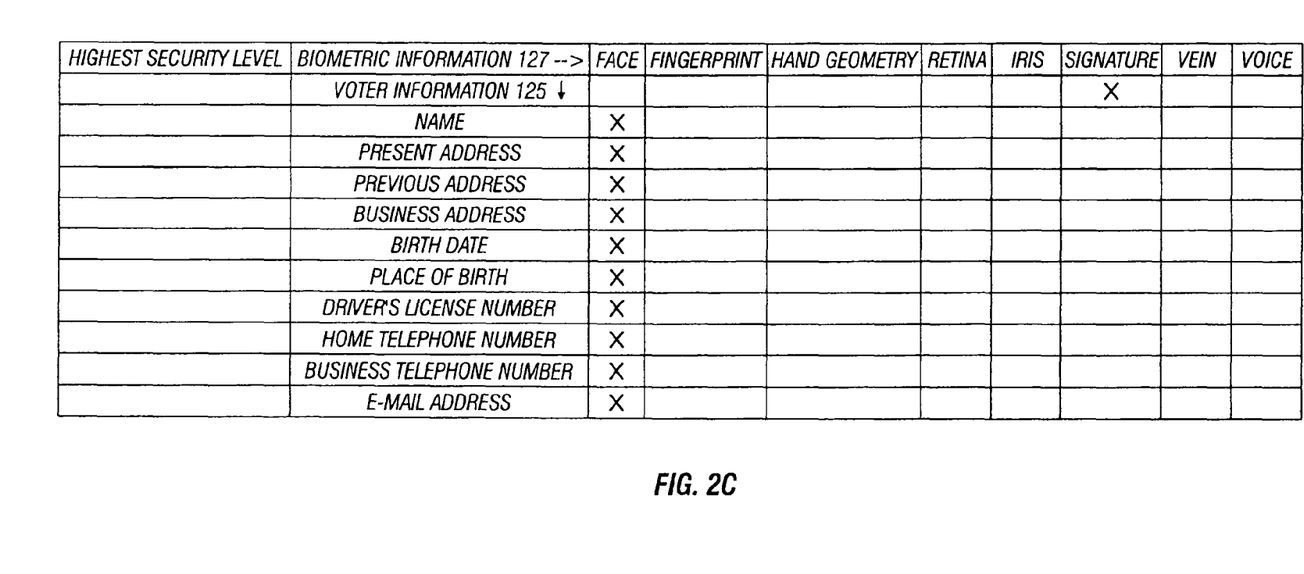

Moreover, if the online voting station 120 is not equipped with the proper equipment to gather the biometric information 127, the quantity of biometric information 127 and voter information 125 may vary depending on the level of security. For example, in a highest security level, if the online voting station 120 is only equipped with a retinal scan, more voter information 125 is required. Therefore, a lack of one type of biometric information 127 may be made up by more voter information 125 for a particular level of security. FIGS. 2A-2C show examples of the relationship between the biometric information 127 and voter information 125 for a given security level. The voter processing center 110 may send messages to the voter 101 to determine the capability of the online voting station 120 for providing biometric information 127. This information is used by the voter processing center 110 in determining the quantity and type of questions to ask the voter 101.

Once successful verifications are made for the voter and biometric information 125, 127, the online voting station 120 receives a voting ballot 126. The voting ballot 126 is displayed on the online voting station 120. The user 101 makes a selection for a candidate and then sends the voting ballot 126 back to the voter processing center 110. The voter processing center 110 may send a confirmation message to indicate the selection. The voter processing center 110 may tally the votes.

FIGS. 2A-2C are grids of examples of amount of biometric information 127 and voter information 125 necessary to access a voting ballot 126 online. FIG. 2A is a matrix for the lowest security level. The lowest security level may only require one type of biometric information 127, for example, retina. Furthermore, the online voting station 120 may be only equipped with a retina scan. The voter information 125 required from the voter 101 may be the voter's name, present address, birth date, and driver's license number. In contrast to a highest security level as shown in FIG. 2B, more biometric information 127 is required from the voter 101. In addition to a retina scan, a fingerprint and hand geometry are required. Due to the larger quantity of biometric information 127, a lower number of voter information 125 is necessary. The voter 101 may only be required to input their name and present address.

However, if the online voting station 120 is only equipped to receive one type of biometric information 127, such as a signature as shown in FIG. 2C, more voter information 125 is necessary for the highest security level. The voter 101 may be required to input more voter information 125 to make up for only one biometric information 127. The voter information 125 may include, in addition to the voter's name and address, a previous home address, business address, date of birth, place of birth, driver's license number, home telephone number, business telephone number, and e-mail address. It should be understood that the type and quantity of biometric information 127 and voter information 125 are not limited to the ones discussed above. There may be more, less, or various other combinations of biometric 127 and voter information 125. The combinations of biometric 127 and voter information 125 may be implemented by software.

Figure 3A:
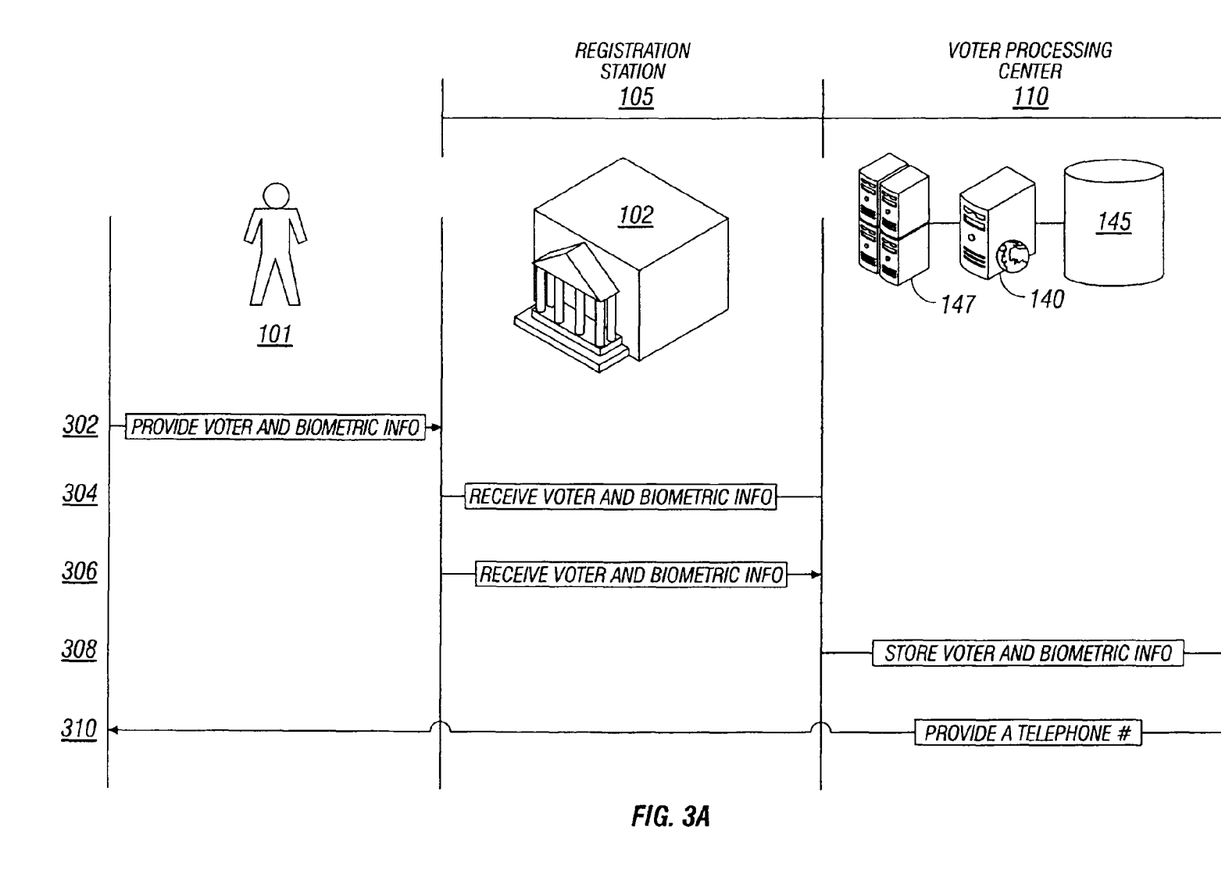
FIGS. 3A-3D are flowcharts of steps performed by the system for securing online voting using a multilayered security process in accordance with an example embodiment.

FIGS. 3A-3D illustrate examples of steps performed by the system 100 for securing online voting using a multilayered security process. Certain components of the system 100 of FIG. 1 are listed across the top of the page, with a sequence of steps detailed beneath them. FIG. 3A illustrates an example transaction that takes place between the registration station 105 and the voter processing center 110. In a first step, the user 101 may come into a registration station 105, such as a city hall 102, to provide voter information 125 and biometric information 127 in step 302. The registration station 105 receives the voter information 125 and biometric information 127 of the voter 101, including a telephone number of the voter 101 in step 304. The registration station 105 then sends the voter information 125 and biometric information 127 to the voter processing center 110 in step 306. The voter processing center 110 upon receiving the voter information 125 and biometric information 127 then stores it in at least one storage device 145 in step 308. The voter processing center 110 then sends the telephone number of the voter processing center 110 to the registration station 105, in response to the user 101 completing the voter information 125 and biometric information 127 in step 310.

Figure 3B:
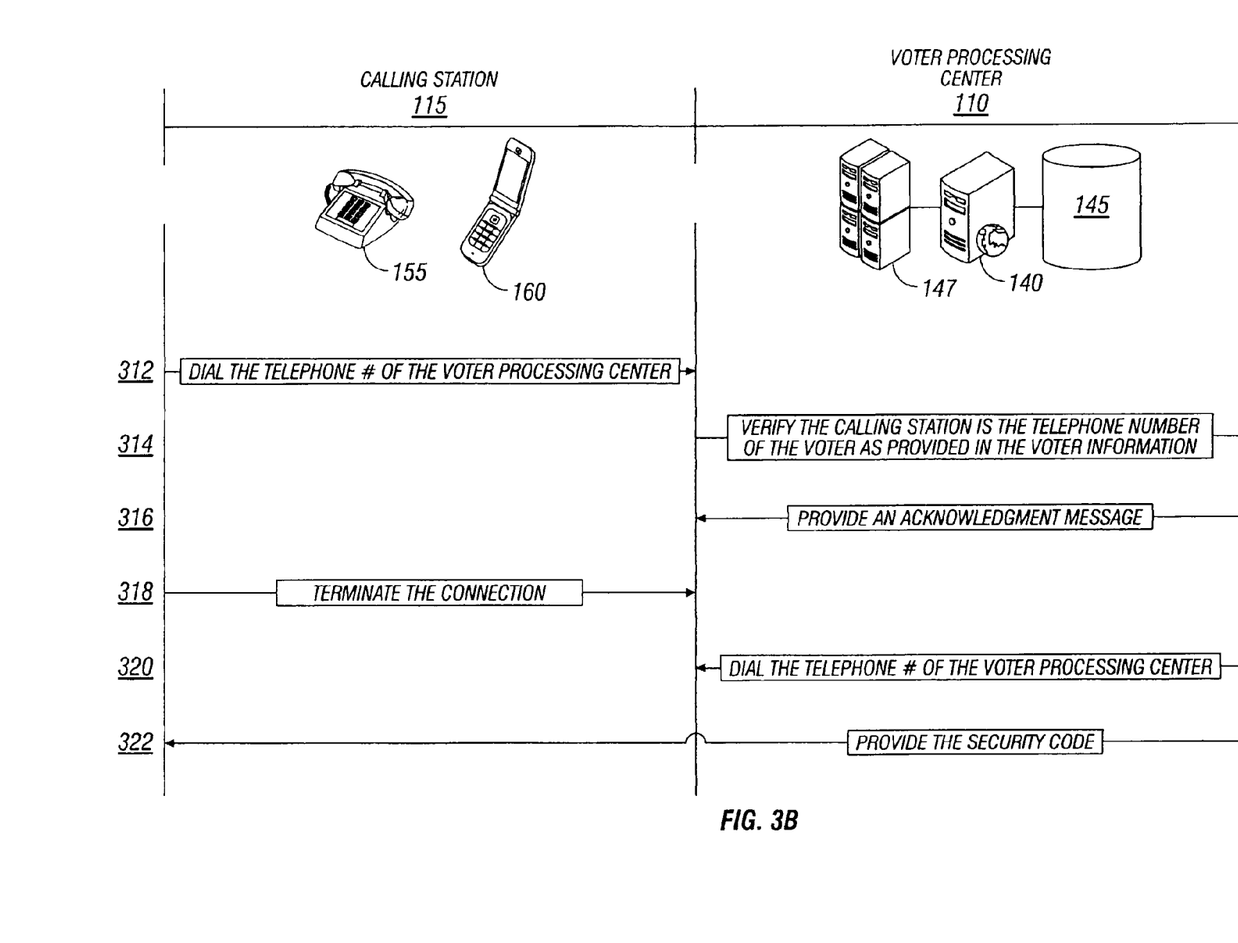

FIG. 3B illustrates an example transaction that takes place between the calling station 115 and the voter processing center 110. The user 101 dials the telephone number that was given to him/her during the registration process in FIG. 3A to make a connection with the voter processing center 110 in step 312. The user 101 must use a calling station 115 that has the telephone number that the user 101 provided during the registration process. The voter processing center 110 may then identify the incoming call telephone number, for example, from using a reverse Automatic Number Identifier (ANI) database and queries for a match of the telephone number that the user 101 provided during the registration process in step 314. If there is not a match, then the voter processing center 110 may send a message that there is not a match and the user 101 should dial from the calling station 115 that represents the telephone number given during the registration process. However, if there is a match, the voter processing center 110 sends an acknowledgement for the match and requests that the user 101 hang up the phone and that the center 110 will call the user 101 back in step 316. As another level of security, the voter processing center 110 then dials the telephone number of the calling station 115 in response to the user 101 terminating the connection between the calling station 115 and the voter processing center 110 (step 318) and the successful match of the verification (step 314) in step 320. The voter processing 110 then provides a security code 150 to the calling station 115 in response to the user 101 picking up the call-back at step 320.

Figure 3C:
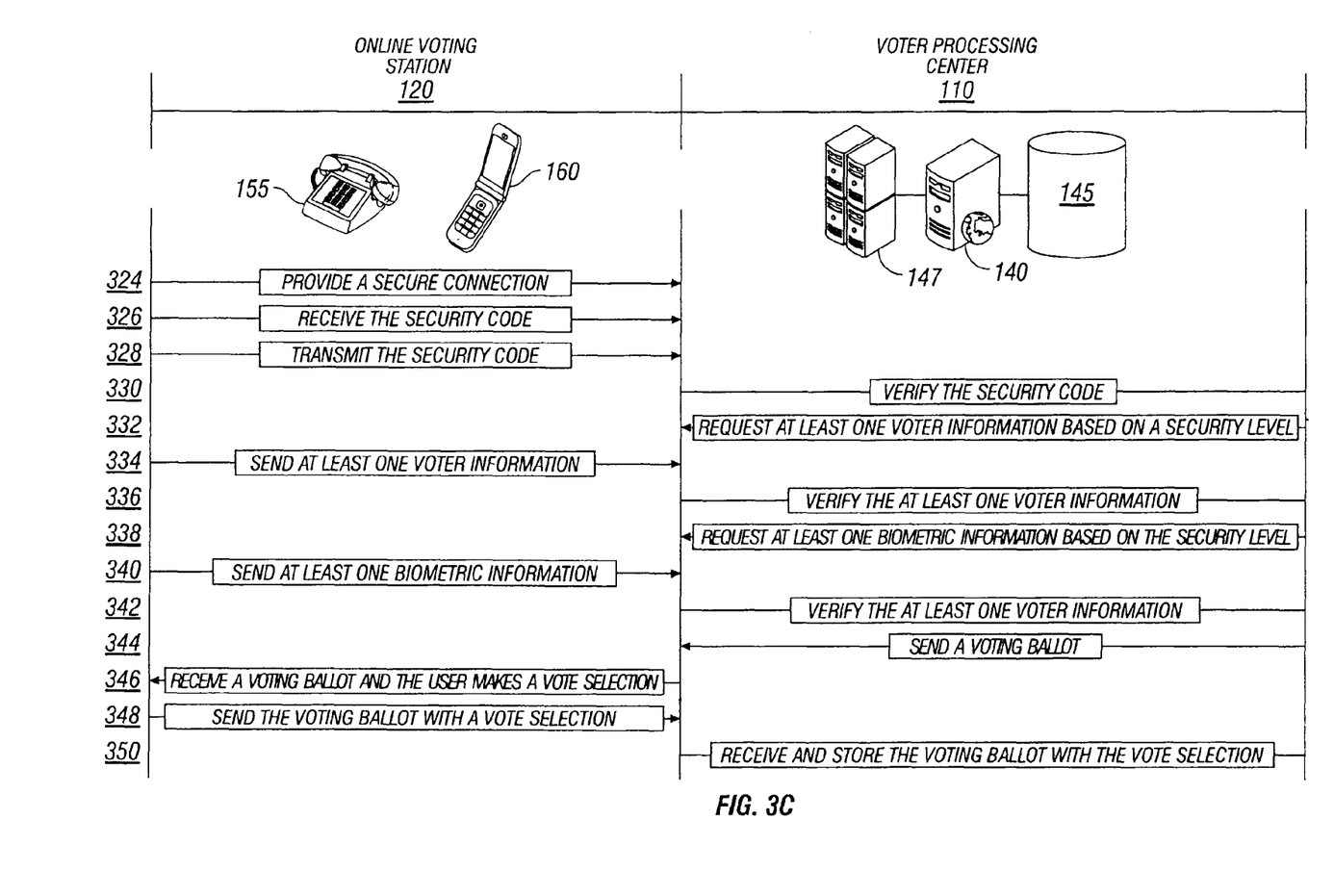

FIG. 3C illustrates an example transaction that takes place between the online voting station 120 and the voter processing center 110. The online voting station 120 makes a secure connection with the voter processing center 110 in step 324. The user 101 then inputs the security code 150 into the online voting station 120 in step 326. The online voting station 120, in turn, transmits the security code 150 to the voter processing station 110 in step 328. The voter processing center 110 then verifies the security code 150 in step 330. If the verification fails, a message is sent to the online voting station 120 notifying of such failed verification (not shown). However, if the verification is successful, the voter processing center 110 may request at least one voter information 125 based on a security level in step 332. The online voting station 120 may receive the at least one voter information 125 into the online voting station 120 by the user 101 in step 334, which in turn, sends it to the voter processing center 110. Upon receipt of the at least one voter information 125, the voter processing center 110 verifies the voter information in step 336. If the verification fails, the voter processing center 110 may send a message notifying the user 101 of such failure (not shown). However, if the verification is successful, the voter processing center 110 may request at least one biometric information 127 based on a security level in step 338. The online voting station 120 may receive the at least one biometric information 127 into the online voting station 120 by the user 101 in step 340, which, in turn, sends it to the voter processing center 110. Upon receipt of the at least one biometric information 127, the voter processing center 110 then verifies the biometric information 127 in step 342. If the verification fails, the processing center 110 may send a message notifying the user 101 of such failure (not shown).

The voter processing center 110 may then send a voting ballot 126 in step 344. The user 101 may receive the voting ballot 126 and makes a vote selection in step 346. The user 101 sends the voting ballot 126 via the online voting station 120 back to the voter processing center 110 in step 348. The voter processing center 110 stores the voting ballot 126 in the storage device 145 in step 350. The voter processing center 110 has the ability to sort and calculate the number of votes for each candidate.

Figure 3D:
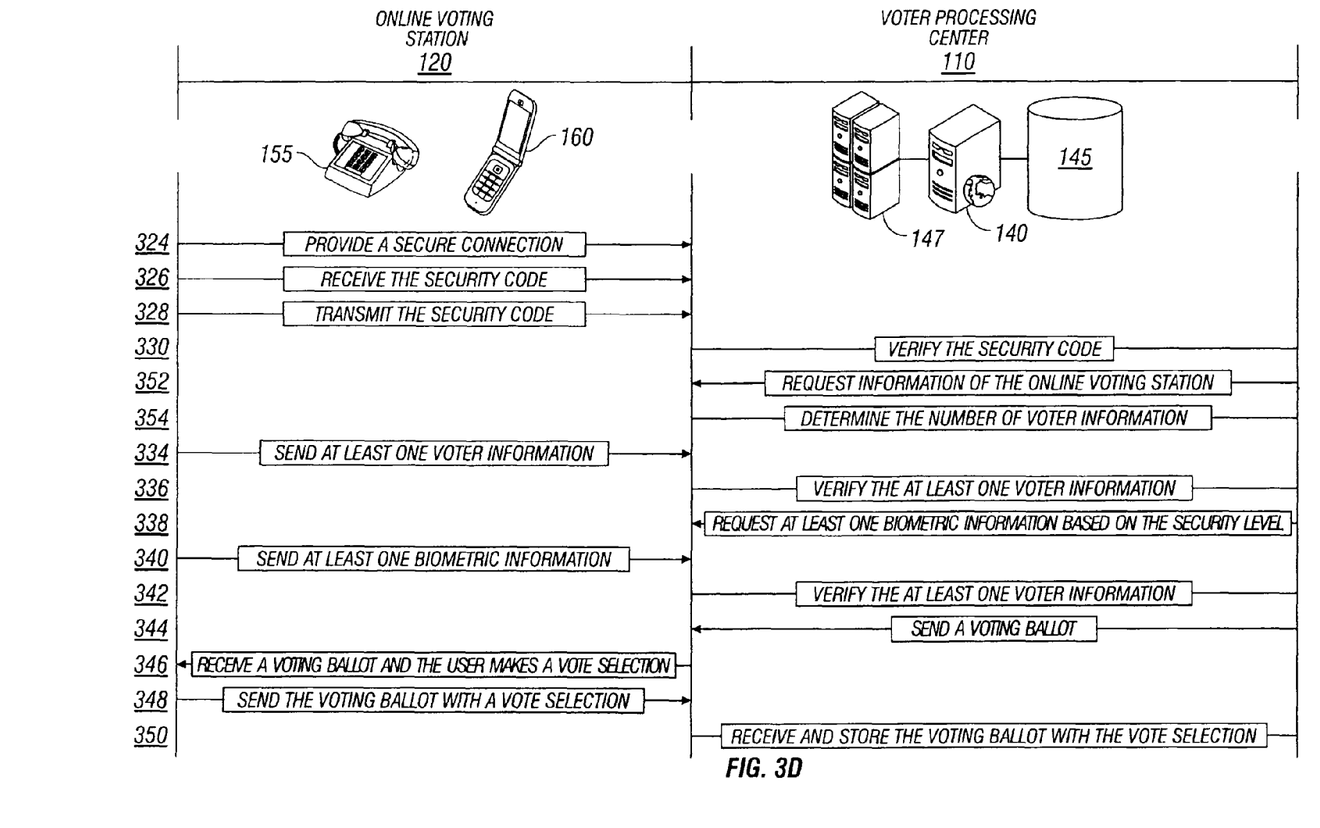

FIG. 3D illustrates another example transaction that takes place between the online voting station 120 and the voter processing center 110. Here the security level dynamically changes depending on the capability of the online voting station 120. This example illustrates the highest level of security and the amount of voter information 125 that is required changes depending on the capability of the online voting station 120 being able to receive biometric information 127. FIG. 3D is similar to FIG. 3C, except for a few more additional steps. Specifically, the voter processing center 110 makes a request to the user 101 via the online voting station 120 to determine the capability of the online voting station 120 in step 352. The request may ask the user 101 to choose from a list of biometric information 127 that the online voting station 120 is capable of receiving. For example, referring to FIG. 2B, the user 101 may indicate that the online voting station 120 is able to receive the following biometric information 127: fingerprint, hand geometry, and retina. Based on this information, the voting processing center 110 is able to determine that for the highest level of security, the voter information 125 that is required would be the voter's name and present address in step 354. The voter processing center 110 may then request at least one voter information 125 to be specifically only the name of the voter 101 and his/her present address in step 332. The voter processing center 110 may also similarly request at least one biometric information 127 to be specifically fingerprint, hand geometry, and retina in step 338.

In another example, referring to FIGS. 2C and 3D, if the user in step 352 of FIG. 3D replies that the only capability of the online voting station 120 is to receive a signature, the voter processing center 110 is able to determine in step 354 the following voter information 125: name, present address, previous address, business address, birth date, place of birth, driver's license number, home telephone number, business telephone number, and e-mail address. Therefore, the voter processing center 110 is able to determine the minimum threshold to satisfy for a given level of security and it is that determination that makes the voter processing center 110 capable of dynamically changing the requirement depending on the capability of the online voting station 120. It should be understood that the voter processing center 110 may request the amount of voter information 125 to determine the minimum quantity and type of biometric information 127 instead of the other way around, using biometric information 127 to determine the minimum and type of voter information 125.

The examples of data transaction between the voter processing center 110, online voting station, registration station 105, and calling station 115 may include one or more of acknowledging the receipt of the electronic registration application, processing voter information 125 and biometric information 127 including checking it for completeness, and the optional printing of the voter registration application and/or a receipt and/or other confirmation by a local printer associated with the computer utilized by the user 101 registering. The registration agency of the registration station 105 may send a confirmation of the person's registration and/or a voter registration card, e.g., by mail so as to confirm that the address provided by the person registering is correct. The voter registration information 125 and biometric information 127 provided by the person 101 registering and any additional information relating to processing the registration application is stored in a voter registration database 145 and all or part thereof is made available in an electronic voter registration database 145 for use by election officials conducting an election. The registration of the voter is completed when all the necessary steps have been performed.

FIG. 4 is an example online voting station 120 in accordance with an example embodiment. The online voting station 120, for example, may be a laptop 122. The laptop 122 may include a retinal scan identification camera 405 and a voice recognition microphone 410. The display screen 420 of the laptop 122 may be a touch screen. The display screen may also be configured to read a fingerprint 415 on the display screen 420. Various other devices, both stationary and mobile, may be employed for capturing voter and biometric information, including but not limited to, touch screen devices, resistive and/or inductive and/or pressure sensitive pads, pocket PCS, Palmtop and other hand-held devices, personal data assistant (PDA) devices, "Tablet" PCs, television, home telephone, cable television system, and the like.

It should be understood that the method and apparatus for registering a registrant, herein described in the example context of registering voters and/or maintaining voting registration records, may find application and/or be employed in many different voting and other transactions and environments. Examples thereof include, but are not limited to, government and private voter registration, government and private voting, whether by direct connection and/or by network, Internet and other network, and any other voting environment where it is desired or necessary to verify the identity of a person with appropriate probability. Examples could also include registration and conduct of labor union elections, union representation elections, corporate elections (such as for shareholder or stockholder voting), corporate governance (such as for director voting), professional and/or learned societies and associations (such as the American Medical Association, American Bar Association, and the like). Examples of other transactions could include medical enrollment, school and educational enrollment and/or registration, insurance, banking, loan registration (application), and other commercial, business and government transactions.

It should also be understood that while the security code is referred to as "numbers," each may include numerical, alphabetic, alpha-numeric and other characters and symbols, conventional or arbitrary, as may be desired. Information is typically represented and/or stored in a memory in accordance with a predetermined formula or algorithm or other scheme, either on a character-by-character basis or on the basis of one or more combinations of the characters or values, for example, binary, binary coded decimal, hexadecimal, or any other digital coding representation thereof. Suitable formula and algorithms therefore include, for example, binary, binary coded decimal, other digital coding representations thereof, parity checks or other parity representations, sum checks, field relationship checks or any other predetermined relationship between the stored data or information and the parity or check number or code.

It should be understood that any of the above-described flow diagrams of FIGS. 3A-3D or underlying methods used to implement aspects related to the networks of FIG. 1 may be implemented in the form of hardware, firmware, software or any combination thereof. If implemented in software, the software may be in any suitable form of software that can be stored on any form of machine-readable medium (e.g., CD-ROM, floppy disk, tape, random access memory (RAM), read-only memory (ROM), optical disk, magnetic disk, FLASH memory, system memory, and hard drive), and loaded and executed by at least one general purpose or application specific processor. The software may be downloaded to nodes in a network via any form of network link including wired, wireless, or optical links, and via any form of communications protocol.

It should be further understood that the flow diagrams of FIGS. 3A-3D are merely example embodiments, and other configurations, arrangements, additional blocks, fewer blocks, and so forth are possible in other embodiments. For example, the techniques illustrated in these figures may be performed sequentially, in parallel or in an order other than that which is described. In addition, it should be appreciated that not all of the techniques described are required to be performed, that additional techniques may be added, and that some of the illustrated techniques may be substituted with other techniques.

What is claimed is:

1. A method comprising:
    receiving into a voting system, from a computing device, non-biometric identification information and biometric identification information for a given person, wherein the non-biometric identification information includes a telephone number;
    storing the received non-biometric identification information and the received biometric identification information;
    receiving a first call from a telephone device;
    verifying a telephone number associated with the telephone device against the stored telephone number for the given person; and
    after verifying the telephone number associated with the telephone device, sending to the telephone device a security code assigned to the given person for voting.

2. A method according to claim 1, wherein receiving non-biometric identification information comprises receiving one or more of a name, an address, a social security number, a political affiliation, and a birth date.

3. A method according to claim 1, wherein receiving biometric identification information comprises receiving one or more of face, fingerprint, hand geometry, retina, iris, signature, vein, and voice information.

4. A method according to claim 1, wherein sending a security code comprises sending an alphanumerical code.

5. A method according to claim 1, wherein the received non-biometric identification information and the received biometric identification arc encrypted.

6. A method according to claim 1, further comprising:
after storing the received non-biometric identification information and the received biometric identification information, sending to the computing device a telephone number associated with the voting system, and wherein receiving the first call from the telephone device comprises receiving the first call at the telephone number associated with the voting system.

7. A method according to claim 1, further comprising:
in response to verifying the telephone number associated with the telephone device, sending to the telephone device a request to terminate the first call; and
after the first call is terminated, initiating a second call with the telephone device at the telephone number associated with the telephone device, wherein sending the security code comprises sending the security code during the second call.

8. A method according to claim 1, further comprising:
after receiving the non-biometric identification information and the biometric identification information, sending to the computing device a registration code assigned to the given person;
during the first call, receiving from the telephone device a registration code; and
verifying the received registration code against the registration code assigned to the given person before sending the security code.

9. A method according to claim 1, wherein receiving biometric identification information for the given person comprises receiving voice information, the method further comprising:
during the first call, obtaining voice information; and
verifying the obtained voice information against the stored voice information for the given person before sending the security code.

10. A method comprising:
sending from a computing device to a voting system non-biometric identification information and biometric identification information for a given person, wherein the non-biometric identification information includes a first telephone number;
after sending the non-biometric identification information and the biometric identification information, receiving from the voting system a second telephone number associated with the voting system;
initiating, from a telephone device associated with the first telephone number, a first call to the second telephone number associated with the voting system;
after initiating the first call, receiving from the voting system a security code assigned to the given person for voting.

11. A method according to claim 10, wherein receiving non-biometric identification information comprises receiving one or more of a name, an address, a social security number, a political affiliation, and a birth date.

12. A method according to claim 10, wherein receiving biometric identification information comprises receiving one or more of face, fingerprint, hand geometry, retina, iris, signature, vein, and voice information.

13. A method according to claim 10, wherein sending the security code comprises sending an alphanumerical code.

14. A method according to claim 10, further comprising:
during the first call, receiving from the voting system a request to terminate the first call;
terminating the first call; and
receiving, at the telephone device associated with the first telephone number, a second call from the voting system, wherein receiving the security code comprises receiving the security code during the second call.

15. A method according to claim 10, further comprising:
after sending the non-biometric identification information and the biometric identification information, receiving from the voting system a registration code assigned to the given person; and
during the first call, sending the registration code to the voting system.

16. A system comprising:
one or more storage devices configured to store one or more of security codes, non-biometric identification information, and biometric identification information for a plurality of people; and
a central computer coupled to the one or more storage devices via one or more servers, the central computer configured to:
receive from a computing device non-biometric identification information and biometric identification information for a given person, wherein the non-biometric identification information includes a telephone number;
store the received non-biometric identification information and the received biometric identification information in the one or more storage devices;
receive a first call from a telephone device;
verify a telephone number associated with the telephone device against the stored telephone number; and
after verifying the telephone number associated with the telephone device, send to the telephone device a security code assigned to the given person for voting.

17. A system according to claim 16, wherein the central computer is further configured to:
after storing the received non-biometric identification information and the received biometric identification information, send to the computing device a telephone number associated with the voting system, and wherein the system is configured to receive the first call at the telephone number associated with the voting system.

18. A system according to claim 16, wherein the central computer is further configured to:
in response to verifying the telephone number associated with the telephone device, send to the telephone device a request to terminate the first call; and
after the first call is terminated, initiate a second call with the telephone device at the telephone number associated with the telephone device, and wherein the system configured to send the security code comprises the system configured to send the security code during the second call.

19. A system according to claim 16, wherein the central computer is further configured to:
after receiving from the computing device the non-biometric identification information and the biometric identification information, send to the computing device a registration code assigned to the given person;
during the first call, receive from the telephone device a registration code; and
verify the received registration code against the registration code assigned to the given person before sending the security code.

20. A system according to claim 16, wherein the biometric identification information for the given person comprises voice information, and wherein the system is further configured to:
- during the first call, obtain the voice information; and
- verify the obtained voice information against the stored voice information for the given person before sending the security code.

21. A system comprising: means for receiving from a computing device non-biometric identification information and biometric identification information for a given person, wherein the non-biometric identification information includes a telephone number;
- means for storing the received non-biometric identification information and the received biometric identification information;
- means for receiving a first call from a telephone device;
- means for verifying a telephone number associated with the telephone device against the stored telephone number for the given person; and
- means for sending to the telephone device a security code assigned to the given person for voting after verifying the telephone number associated with the telephone device.

22. A system according to claim 21, further comprising:
means for sending to the computing device a telephone number associated with the voting system after storing the received non-biometric identification information and the received biometric identification information, and wherein the means for receiving the first call from the telephone device comprises means for receiving the first call at the telephone number associated with the voting system.

23. A system according to claim 21, further comprising:
- means for sending to the telephone device a request to terminate the first call in response to verifying the telephone number associated with the telephone device; and
- means for initiating a second call with the telephone device at the telephone number associated with the telephone device after the first call is terminated, and wherein the means for sending the security code comprises means for sending the security code during the second call.

24. A system according to claim 21, further comprising:
means for sending to the computing device a registration code assigned to the given person after receiving the non-biometric identification information and the biometric identification information;
- means for receiving a registration code from the telephone device during the first call; and
- means for verifying the received registration code against the registration code assigned to the given person before sending the security code.

25. A system according to claim 21, wherein the biometric identification information for the given person comprises voice information, the system further comprising:
- means for obtaining voice information during the first call; and
- means for verifying the obtained voice information against the stored voice information for the given person before sending the security code.

* * * * *

UNITED STATES PATENT AND TRADEMARK OFFICE
CERTIFICATE OF CORRECTION

PATENT NO.        : 8,441,337 B2
APPLICATION NO.   : 12/832891
DATED             : May 14, 2013
INVENTOR(S)       : Fein et al.

Page 1 of 1

It is certified that error appears in the above-identified patent and that said Letters Patent is hereby corrected as shown below:

In the Specification

In Column 4, Line 21, delete "an/or" and insert -- and/or --, therefor.

In the Claims

In Column 11, Line 5, in Claim 5, delete "arc" and insert -- are --, therefor.

Signed and Sealed this
Twentieth Day of May, 2014

Michelle K. Lee
*Deputy Director of the United States Patent and Trademark Office*